Oct. 3, 1944.  I. L. SHOGRAN  2,359,533
OIL COOLER FOR AIRCRAFT ENGINES
Filed March 20, 1942  2 Sheets-Sheet 1
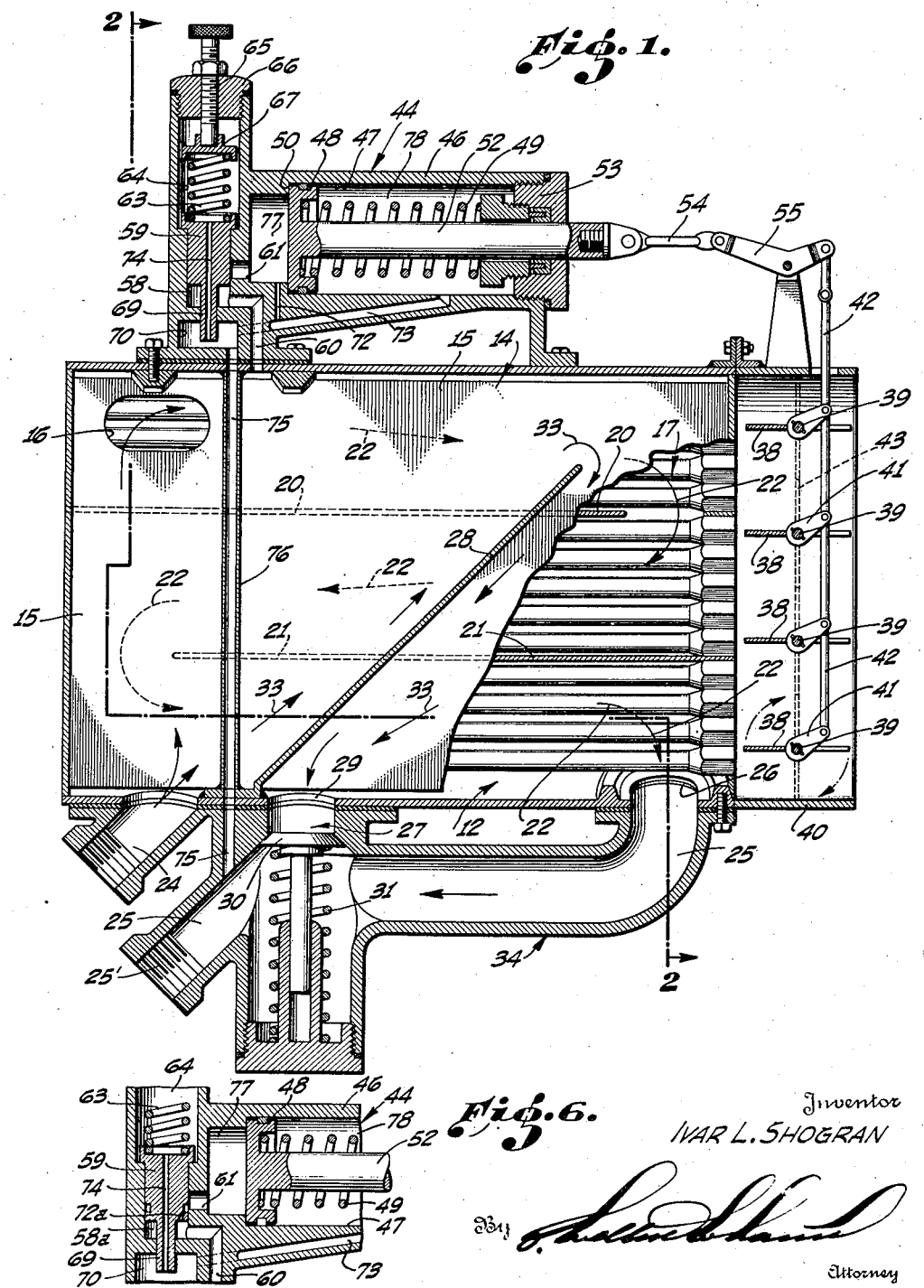
Inventor
IVAR L. SHOGRAN
Attorney Oct. 3, 1944.  I. L. SHOGRAN  2,359,533
OIL COOLER FOR AIRCRAFT ENGINES
Filed March 20, 1942  2 Sheets-Sheet 2
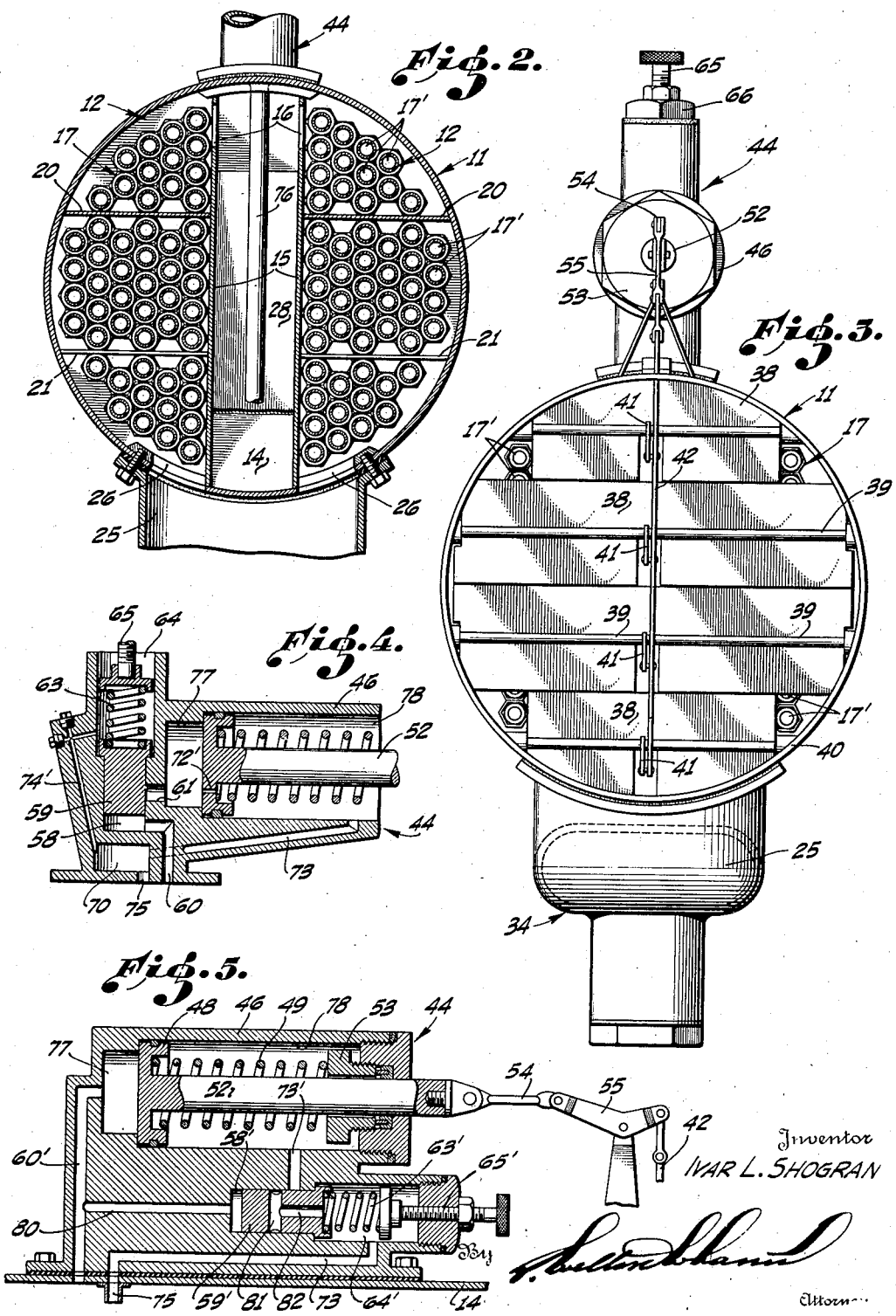
Inventor
IVAR L. SHOGRAN cylinder; a piston in said cylinder and operatively connected to said shutter means; means whereby said shutter means is yieldably held open and said piston is yieldably held in normal position in said cylinder; walls forming a passage connected to said chamber and to said cylinder on one side of said piston; walls forming a passage connecting said outlet and said cylinder on the opposite side of said piston; and pressure responsive means for opening or closing one of said passages, said pressure responsive means being connected so as to receive fluid under pressure which fluctuates in accordance with the fluid pressure in said cooler.

2. In a liquid cooling device, a radiator, an inlet for said radiator and an outlet for said radiator, means forming a liquid receiving chamber interposed between said inlet and said radiator, means forming an opening between said chamber and said radiator providing for liquid flow therebetween, means forming a separate outlet for said chamber and provided with pressure responsive bypass valve means for normally maintaining said outlet closed, air flow control means for regulating the flow of air through said radiator, pressure responsive means in communication with said chamber and having connection for operating said air flow control means independently of said bypass valve means, and surge preventing means comprising a pressure actuated valve element operatively interposed between said chamber and said second pressure responsive means.

3. In a liquid cooling device including a radiator, air flow control means therefor, and a liquid receiving chamber in communication therewith, means for operating said air flow control means comprising a liquid pressure drop responsive device in communication with said chamber and a part of said radiator spaced from said chamber and being operatively connected to said air flow control means, and surge-damping means interposed between said chamber and said liquid pressure drop responsive device to control the transmission of liquid pressure from said chamber to said device, said surge-damping means comprising a valve connected so as to receive and so as to be actuated in accordance with changes in pressure in said chamber.

4. In a liquid cooling device having a radiator, air flow control means operable to control the liquid cooling effectiveness of said radiator, a liquid receiving chamber adjacent said radiator and in communication with said radiator and into which the liquid being cooled is passed, the combination including: pressure operated means operatively connected to said air flow control means adapted to be operated by liquid under pressure; a pressure operated valve means operable in response to pressure in said device to allow liquid to flow to said pressure operated means for operating same; valve return means for returning said pressure operated valve means to closing position when the liquid pressure drops after said valve means has been operated; and bleeder means allowing said liquid to flow from said pressure operated means, thus allowing said control means to return to normal position.

5. In a liquid cooling device having a radiator, air flow control means operable to control the liquid cooling effectiveness of said radiator, a liquid receiving chamber adjacent said radiator and in communication with said radiator, and into which the liquid being cooled is passed, the combination including: pressure operated means operatively connected to said control means; a pressure operated valve means operable in response to pressure in said device to allow liquid to flow to said pressure operated means for operating same; valve return means for returning said pressure operated valve means to closing position when the liquid pressure drops after said valve means has been operated; and means for controlling the return movement of said control means.

6. In a liquid cooling device including a radiator, air flow control means therefor, and a liquid receiving chamber in communication therewith, an outlet for said radiator, means for operating said air flow control means comprising a liquid pressure drop responsive device operatively connected to said air flow control means, passages connecting said pressure drop responsive device with said outlet and said chamber, wall means forming a valve chamber positioned in said passage which connects said pressure drop responsive device with said chamber, and a sliding valve operable in said valve chamber and being subjected to pressure existing in said chamber, said sliding valve being so constructed and arranged to open said passage after it has been slid a predetermined distance by a rise in pressure in said chamber whereby hunting of said operating means will be reduced.

7. In a liquid cooling device including a radiator, air flow control means therefor, and a liquid receiving chamber in communication therewith, an outlet for said radiator, means for operating said air flow control means comprising a liquid pressure drop responsive device operatively connected to said air flow control means, passages connecting said pressure drop responsive device with said outlet and said chamber, valve means normally closing one of said passages and being operated by liquid pressure in the device to open said passage after said valve means has moved a predetermined distance, means for closing said valve means, thus closing said passage upon a reduction in liquid pressure, and means for allowing said pressure drop responsive device to return to normal position at a controlled rate of speed.

8. In a cooling device of the character described, the combination of: a radiator having an inlet passage leading thereto and an outlet passage leading therefrom; bypass means having a bypass passage connecting said inlet passage and said outlet passage; a relief valve for said bypass passage arranged to open at a pressure within the safe working pressure of said radiator; air flow control means for controlling a flow of air through said radiator; and pressure responsive means for operating prior to the opening of said relief valve to actuate said control means in response to changes in pressure drop through said radiator, said pressure responsive means comprising a chamber and an intermediate movable wall placed so as to substantially prevent a flow of liquid through said chamber, said chamber having an inlet and an outlet disposed on opposite sides of said movable wall and connected to said radiator in such spaced relation that a pressure-drop through said radiator will produce a pressure differential on said movable wall to move the same prior to the opening of said relief valve, and means acting in response to movement of said movable wall to operate said control means.

9. In an oil cooling device of the character described, the combination of: a radiator having an inlet passage leading thereto and an outlet passage leading therefrom, said radiator having oil passages therein of such size that changes in the viscosity of the oil resulting from changes in the temperature thereof due to the cooling action of the radiator will produce changes in pressure in the radiator; bypass means comprising a valved bypass passage connecting said inlet and said outlet passages; airflow control means for controlling a flow of air through said radiator; and means for operating said control means in response to changes in pressure in said radiator, said means comprising a chamber having a movable wall, an inlet connecting said chamber with said radiator through which oil under pressure from said radiator may pass to said chamber to move said movable wall, valve means in said inlet operated by pressure received from said radiator to control flow of oil through said inlet, and means acting in response to movement of said movable wall to operate said control means.

10. In an oil cooling device of the character described, the combination of: a radiator having an inlet passage leading thereto and an outlet passage leading therefrom, said radiator having oil passages therein of such size that changes in the viscosity of the oil resulting from changes in the temperature thereof due to the cooling action of the radiator will produce changes in pressure in the radiator; means for controlling flow of a cooling medium through said radiator; and means for operating said control means in response to changes in pressure in said radiator, said means comprising a chamber having a movable wall so disposed with relation to the remaining walls of said chamber that there will be from said chamber substantially no flow of oil from the front to the rear of said movable wall, means yieldably urging said movable wall into a normal position, said chamber having an inlet connected to said radiator whereby pressure of the oil in said radiator will be transmitted to the front face of said movable wall to move the same away from said normal position, and means acting in response to movement of said movable wall by the pressure transmitted thereto to operate said control means, and movable valve means associated with said inlet to control the flow of oil therethrough.

11. In a cooling device of the character described, the combination of: a radiator having an inlet passage leading thereto and an outlet passage leading therefrom; flow control means for controlling a flow of cooling medium through said radiator; and motor means for operating said control means in response to changes in pressure drop through said radiator, said motor means comprising a chamber and an intermediate movable wall placed so as to substantially prevent a flow of liquid through said chamber, said chamber having an inlet duct and an outlet duct disposed on opposite sides of said movable wall and connected to said radiator in such spaced relation that a pressure drop through said radiator will produce a pressure differential on said movable wall to move the same, a valve responsive to pressure changes in said radiator to relatively open and close said outlet duct, and means acting in response to movement of said movable wall to operate said control means.

12. In a cooling device of the character described, the combination of: a radiator having an inlet passage leading thereto and an outlet passage leading therefrom; air flow control means for controlling a flow of a cooling medium through said radiator; and motor means for operating said control means, said motor means comprising a chamber and an intermediate movable wall placed so as to substantially prevent a flow of liquid through said chamber, said chamber having an inlet duct and an outlet duct disposed on opposite sides of said movable wall and connected to said radiator in such spaced relation that a pressure drop through said radiator will produce a pressure differential on said movable wall to move the same, valve means in one of said ducts, said valve means comprising a valve closure to normally close said last named duct and means for moving said closure into a position wherein the duct will be open, said valve means having a port in communication with said chamber when said valve closure normally closes the duct, through which a controlled flow of oil may pass to and from said chamber, and means acting in response to movement of said movable wall to operate said control means.

13. In a cooling device of the character described, the combination of: a radiator having an inlet passage leading thereto and an outlet passage leading therefrom; air flow control means for controlling a flow of air through said radiator; fluid motor means for operating said control means; and means for delivering fluid under pressure to said fluid motor means to actuate the same, said delivery means having a first passage connected to said motor means through which the operating fluid may pass under normal conditions of operation of said cooler, and a second passage connected to said motor means, said second passage having valve means therein normally in closed position and opening in response to a rise in pressure in said inlet passage above a predetermined value as the result of thickening of oil in the cooler.

14. In an oil cooling device of the character described, the combination of: a radiator; inlet means for delivering oil to said radiator; outlet means for carrying oil away from said radiator; bypass means comprising a valved passage connecting said inlet means and said outlet means, arranged to open when a prescribed pressure in said inlet is reached; and means operating through a range of pressures below the pressure at which said bypasss means opens for passing a variable flow of cooling medium through said cooler, comprising flow varying means, a chamber arranged so that it will receive oil under pressure from said inlet means, said chamber having a movable wall disposed so that it will be moved by the pressure of said oil thereagainst at pressures below said pressure at which said bypass means opens, and means connected to said movable wall for operating said flow varying means in accordance with the movement of said movable wall.

15. In an oil cooling device of the character described, the combination of: a radiator; inlet means for delivering oil to said radiator; outlet means for carrying oil away from said radiator; by-pass means comprising a valved passage connecting said inlet means and said outlet means, arranged to limit the maximum pressure which may be transmitted through said inlet to the interior of said cooler; and means operating through a range of pressures below said maximum pressure for passing a variable flow of cooling medium through said cooler, comprising flow varying means, a chamber having a passage connected to said inlet means for conveying oil under pressure into said chamber, said chamber having a movable wall disposed so that it will be moved by the pressure of said oil thereagainst, means connected to said movable wall for operating said The normal operation of cooling device described when employed as a lubricant or oil cooler for aircraft engines is as follows:

The lubricant which passes from the engine to the inlet 24 is usually at a temperature of between 180° and 190° F. The lubricant first flows into the chamber 14 and fills the chamber, the bypass means 27 at this time being closed, the piston valve 59 being in closed position, the pressure operated piston 48 being against the shoulder 50 and the shutters 38 being in open position, as shown by full lines. The hot lubricant passes through the openings 16 and through the radiator as indicated by arrows 22. The cooled lubricant passes through the outlet 25 to the return piping of the oil circulating system and is usually at a temperature of between 140° and 160° F.

The chamber 77 formed by the part of the bore 47 lying to the left of the piston 48 is connected to the inlet 24 of the device through the passage or port 61, a portion of the bore 58, the passage 60, and the leftward portion of the chamber 14. Accordingly, the pressure exerted against the lower face of the valve piston 59 is substantially the same as, and varies with, the pressure of the hot oil entering the device through the inlet 24, and when the lower end of the piston 59 is above the passage 61, pressure will be applied to the left face of the piston 48, substantially the same as, and varying with, the pressure of the hot oil entering through the inlet 24. It will be recognized, however, that the pressure in the chamber 77 lying to the left of the piston 48 will be determined by the rate of flow in through the passage 61 and out through the bleeder passage 72, and since the bleeder passage 72 is of relatively small diameter, the pressure in the chamber 77 will be affected by the viscosity of the oil. In further explanation of this, it may be mentioned that when the valve piston 59 first opens the passage 61, the oil will flow into the chamber 77 at a higher rate than it flows out through the bleeder passage 72. Accordingly, the volume of the body of oil lying to the left of the piston 48 will increase and the piston 48 will be moved rightward against the action of the spring 49, gradually increasing the pressure of the spring, until the pressure on the body of oil lying to the left of the piston 48 is such that the rate of oil inflow through the passage 61 and the rate of oil outflow through the bleeder 72 are the same, and the piston 48 will then remain substantially stationary in this position.

The chamber 78 in the bore 47 to the right of the piston 48 is closed by the packing means represented by the stuffing box 53, and since this chamber 78 is connected through passage 73, space 70, and passage 75 with the outlet 25, the pressure existing in the chamber 78 and applied to the rightward face of the piston 48 will have a value corresponding to and varying with the pressure in the outlet 25, and when the passage 61 is open the piston 48 will be subjected to a rightwardly acting pressure-differential which will vary substantially in accordance with the pressures existing in the inlet 24 and the outlet 25. Likewise, the piston valve 59 is moved upward against the pressure of the spring 63 by an upwardly acting pressure differential which varies in magnitude with the pressure differential existing between the inlet 24 and the outlet 25, for it will be noted that the lower face of the piston valve is subjected to inlet pressure through the passage 60 and the upper face of the piston valve 59 is subjected to outlet pressure through the passage 74, the space 70 and the passage 75. The space 70 has been referred to as a drain space, and the passage 73 has been referred to as a drain passage. This descriptive terminology is believed to be not improper for the reason that the outlet 25 is connected to a vented reservoir located at a level lower than the outlet oil so that there will be no back pressure in the outlet 25, there will be a simple drainage of oil from the cylinder space or chamber 78, through the passage 73 and from the space 70, and where there is back pressure in the outlet 25 so that the spaces 70 and 78 are constantly filled with fluid under outlet pressure, such leakage as may occur downward around the stem 69 from the lower end of the chamber 58 will be drained off through or will drain into the space 70 and as this leakage continues, it will gradually find its way through the passage 75 into the outlet 25, and leakage of oil from the chamber 77 past the piston 48 into the fluid filled chamber 78 must eventually drain to the outlet through the passage 73.

If at any time during the operation of the device, the lubricant should become cooled in the radiator to such an extent that its viscosity will impede the flow of oil through the radiator, the build-up in the pressure in the inlet 24 and in the chamber 14 may become sufficient to lift the piston valve 59 against the action of the spring 63 to open the passage or port 61, lubricant will then flow into the chamber 77 and the movable wall, represented by the piston 48, will be moved rightwardly against the action of the spring 49 to an extent determined by the several factors involved, including the pressure differential previously referred to and which is applied to the opposite sides of the piston 48, the extent to which the passage 61 is opened, and the rate of flow through the bleeder 72. The link 54 and the bellcrank 55 comprise means which operate in response to rightward movement of the movable wall 48 to move the shutters toward closed position represented by dotted lines 43. When the shutters are thus moved, the amount of air which can flow through the radiator is decreased and therefore the cooling effectiveness of the radiator is decreased. At the same time the heat of the hot lubricant in the chamber 14 is employed to raise the temperature in the radiator with the result that the temperature of the oil in the radiator will be increased and its viscosity will be decreased to such an extent that a normal flow may be rehabilitated. If a normal flow through the radiator is not rehabilitated by a partial closing of the shutters 38, the piston 48 will be forced to its extreme rightward position and the shutters 38 will be fully closed, as indicated by dotted lines 43, and at this time no cooling air will flow through the radiator.

In the more severe conditions of clogging where the clogging is not eliminated even after the shutters have been fully closed, and there is inadequate outflow for the lubricant, the pressure will continue to increase and when the pressure in the chamber reaches a predetermined amount, the bypass means 27 will be opened and the lubricant will then flow through the chamber 14, as indicated by arrows 33, passing through the casting 34 whereby it is returned to the aircraft engine without passing through the radiator 12. The bypass means is set to open at a higher pressure than is required to operate the piston valve 59 or the pressure responsive piston 48 and therefore the bypass port will not be open until after the shutters have been fully closed and the opening of the bypass will have no effect on the shutter control mechanism. When the clogging of the radiator is eliminated or at least reduced to such an extent that there is sufficient flow therethrough to reduce the pressure in the device sufficiently to allow the piston valve 59 to be returned to closing position, the piston valve will be returned by the spring 63 to the position shown in Fig. 1, at which time the hot lubricant is trapped in the left end of the bore 47. However, due to the provision of the bleeder 72, this lubricant will be slowly forced from the cylinder due to the action of the spring 49, and therefore the shutters 38 will be slowly moved to fully open position. It will be observed that the normal position of the shutters 28 is a fully open position and that the normal position of the associated parts is the position which those parts occupy when the shutters are in open position. This position of the shutters or of the parts operatively connected thereto is referred to as the normal position of these parts. It will be seen, therefore, that the bleeder 72 constitutes a means which allows the shutters to return to normal at a predetermined rate of speed, this speed being adjustable by adjusting the nut which is engaged by the spring 49 which, as will be obvious, changes the compression of the spring.

During the operation of the device the shutter may be moved to a partly closed position and may alternate between partly closed and fully open positions over a period of time. It is only when a substantial clogging has occurred that the shutters will be fully closed and the bypass means 27 opened.

In Fig. 1 I have shown the passage 77 which communicates with the space 64 above the piston valve 59 as extending through the body and stem 69 of the piston valve 59. In Fig. 4 I have shown how the piston valve 59 may be made solid and how the passage 74 may be replaced by a passage 74' formed in the housing of the control unit 44, this passage 74' connecting the chamber 64 with the outlet pressure variations through the space 70 and with the passage 75. Also, in Fig. 1 I have shown the bleeder passage 72 extended through the wall which surrounds the leftward portion of the bore 47, connecting the chamber 77 with the passage 73. In Fig. 4 I have indicated that this bleeder passage 72 may be otherwise placed. For example, it may be replaced by a bleeder opening 72' through the piston 48. The only advantage which the bleeder passage 72, Fig. 4, might have over the bleeder passage 72 of Fig. 1 is that by removal of the piston of the bore, the bleeder passage 72' will be exposed and conveniently cleaned.

In Fig. 5 I have shown that the control valve may be transferred from the position in which it is shown in Fig. 1 to a position where it will act on the outlet passage 73' communicating with the chamber or space 78 lying to the right of the piston. In Fig. 5 a passage 60' analogous to the passage 60 of Fig. 1 transmits the inlet pressure existing in the inlet 24 and the chamber 14 to the chamber 77 lying to the left of the movable wall represented by the piston 48. This inlet pressure is also transmitted through a passage 80 to the leftward end of a bore 58', in which a piston valve 59' is slidable against the action of a spring 63' adjusted by a screw 65. The piston 59' has a port 81 communicating through a passage 82 with the chamber 64' lying adjacent the rear end of the piston valve 59' in the enlarged portion of the bore 58', and this chamber 64' is connected with outlet pressure through the lower portion of a passage 73' which communicates with the passage 75. The upper portion of the passage 73' extends between the space 78 to the right of the piston 48 and the bore 58'; it may be said that the passage 73' leading from the rightward portion of the cylinder is intersected by the bore 58' and is intercepted by the valve 59' when such valve 59' is in the position shown in Fig. 5.

As the pressure differential between the inlet and outlet of the cooler builds up due to congealing of oil or change in viscosity thereof within the radiator sections of the cooler, this pressure differential will be applied rightwardly against the piston valve 59' and a rightward movement of this piston valve 59' will be initiated. At the same time, there will be a build-up in pressure in the chamber 77 tending to move the piston 48 in rightward direction, but such rightward movement cannot occur until the piston valve 59' has been moved rightwardly a sufficient distance to bring the port 81 thereof into communication with the upper portion of the passage 73', thereby releasing from the chamber 78 the oil which has been trapped therein and which has prevented rightward movement of the piston 48. The space 78 will be then connected to the outlet 25 and the pressure differential acting on the piston 48 will correspond somewhat to and will vary with the pressure differential between the inlet 24 and the outlet 25. Under static conditions the pressure differential applied to the piston 48 or to the piston valve 59 will be identical to the pressure differential between the inlet 24 and the outlet 25, but when there is movement of oil through the passages leading to and from the piston, there may be a small change in the value of the pressure differential as applied to the piston members of the invention. As in Fig. 1, the pressure differential applied to the piston 48 of Fig. 5 determines the distance which the piston 48 is moved against the pressure of the spring 49.

The bleeder passage 72, Fig. 1, connects the chamber 77 with lower pressure than exists in the chamber 77 when the piston 48 is moved rightward from the position in which it is shown in Fig. 1. As shown in Fig. 6, this bleeder passage may consist of a passage 72a formed in the valve piston 59 so as to connect the space 58a with an annular groove g which communicates with the port 61. In the operation of this form of the invention, the piston 48 after being forced rightward cannot return toward its initial position until the pressure within the inlet portion of the cooler drops to a value lower than the pressure existing in the chamber 77. When this occurs, as it does in the normal operation of the device, oil may bleed from the chamber 77, through the port 61, the bleeder passage 72, the space 58a and the passage 60 into the inlet portion of the cooler, and the position of the piston 48 will be determined by the relative values of pressure within the cooler and pressure exerted by the spring 49 during the different stages of its compression.

I claim as my invention:

1. In a liquid cooling device, the combination of: a radiator; a chamber in heat transmitting relation to said radiator, there being means whereby liquid may flow from said chamber into said radiator; an inlet for said chamber; an outlet for said radiator; shutter means for controlling the flow of air through said radiator; a flow varying means in accordance with the movement of said movable wall, and valve means for controlling the flow of oil through said passage to said chamber.

16. In an oil cooling device of the character described, the combination of: a radiator; inlet means for delivering oil to said radiator; outlet means for carrying oil away from said radiator; by-pass means comprising a valved passage connecting said inlet means and said outlet means, arranged to limit the maximum pressure which may be transmitted through said inlet to the interior of said cooler; and means operating through a range of pressures below said maximum pressure for passing a variable flow of cooling medium through said cooler, comprising flow varying means, a chamber having a passage connected to said inlet means for conveying oil under pressure into said chamber, said chamber having a movable wall disposed so that it will be moved by the pressure of said oil thereagainst, means connected to said movable wall for operating said flow varying means in accordance with the movement of said movable wall, and valve means for closing said passage, said valve means opening in response to a predetermined rise in pressure in said inlet means to permit a relatively large flow of oil into said chamber, said valve means having a port communicating with said chamber through which oil may pass to and from said chamber when said valve means is in its closed position.

17. In an oil cooling device of the character described, the combination of: a radiator; inlet means for delivering oil to said radiator; outlet means for carrying oil away from said radiator; by-pass means comprising a valved passage connecting said inlet means and said outlet means, arranged to limit the maximum pressure which may be transmitted through said inlet to the interior of said cooler; and means operating through a range of pressures below said maximum pressure for passing a variable flow of cooling medium through said cooler, comprising flow varying means, a chamber having a passage connected to said inlet means for conveying oil under pressure into said chamber, said chamber having a movable wall disposed so that it will be moved by the pressure of said oil thereagainst, means for applying pressure to said wall to return the same to its initial position after it has been so moved, means connected to said movable wall for operating said flow varying means in accordance with the movement of said movable wall, and valve means for controlling the flow of oil through said passage to said chamber, said valve means embracing walls forming a port through which a controlled flow of oil may pass from said chamber to said inlet means when the pressure in said inlet means drops below the pressure in said chamber after said movable wall has been moved by the pressure of said oil thereagainst.

IVAR L. SHOGRAN.

Oct. 3, 1944.   H. SLATNICK   2,359,534
INCENDIARY BOMB AND FIRE EXTINGUISHER
Filed June 20, 1942   2 Sheets-Sheet 1
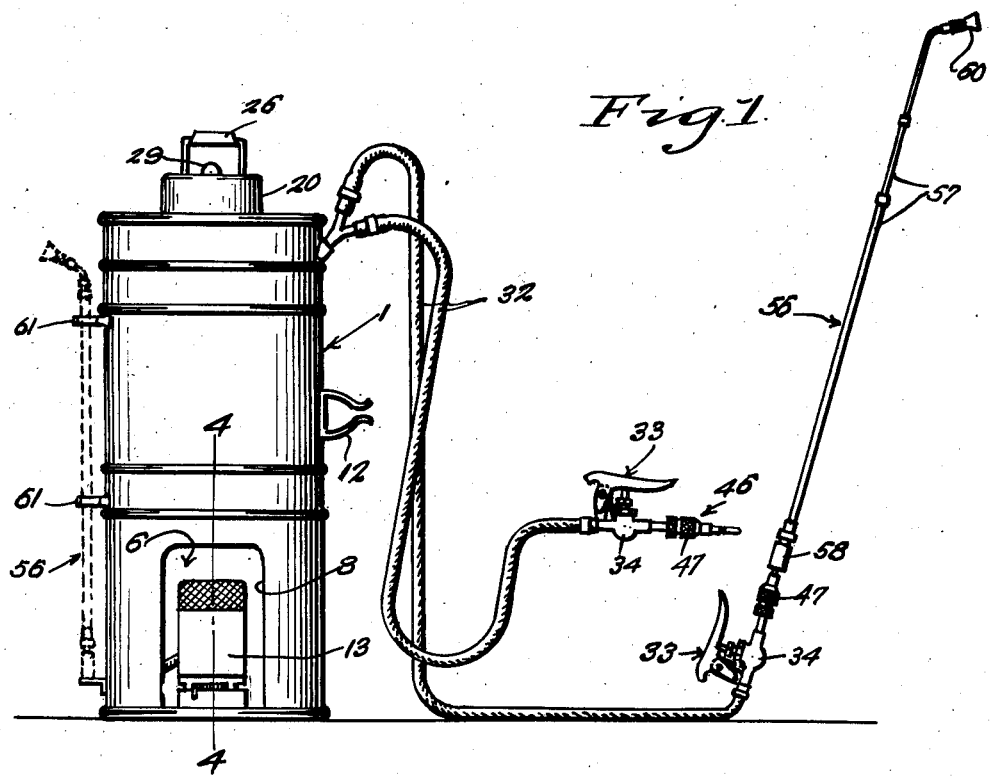
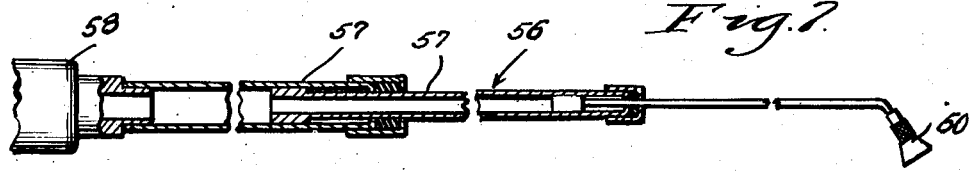
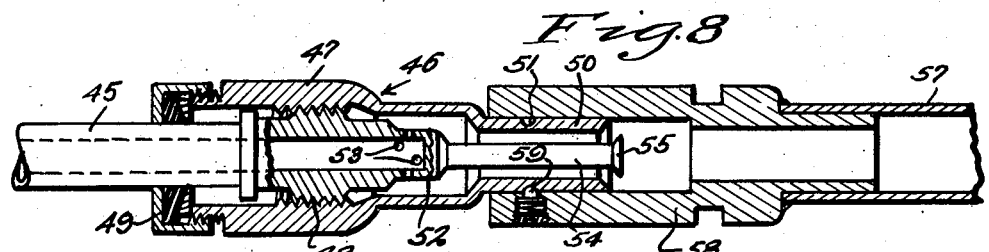
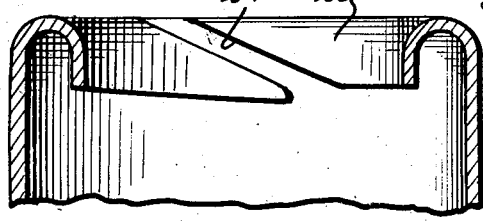
Inventor
Harry Slatnick
By Clarence A. O'Brien
and Harvey B. Jacobson
Attorneys